United States Patent [19]

Bircann

[11] Patent Number: 6,062,536
[45] Date of Patent: May 16, 2000

[54] SOLENOID ACTUATOR WITH SEALED ARMATURE

[75] Inventor: Raul Armando Bircann, Penfield, N.Y.

[73] Assignee: General Motors Corporation, Detroit, Mich.

[21] Appl. No.: 09/320,502

[22] Filed: May 26, 1999

[51] Int. Cl.$^7$ .............................. F16K 31/02; F16K 31/44
[52] U.S. Cl. ..................... 251/129.15; 277/438; 251/214
[58] Field of Search ......................... 251/129.15, 129.17, 251/215, 214, 336.2; 227/437, 438, 530, 534, 647, 904

[56] References Cited

U.S. PATENT DOCUMENTS

| | | | |
|---|---|---|---|
| 2,690,939 | 10/1954 | Whaley | 306/2 |
| 2,755,059 | 7/1956 | Auwarter | 251/167 |
| 4,121,843 | 10/1978 | Halling | 277/200 |
| 5,192,048 | 3/1993 | Wakeman | 251/129.16 |
| 5,924,672 | 7/1999 | Crochet et al. | 251/63.6 |

*Primary Examiner*—Joseph A. Kaufman
*Assistant Examiner*—David A. Bonderer
*Attorney, Agent, or Firm*—Timothy D. MacIntyre

[57] ABSTRACT

A gas valve has a solenoid actuator which is energized to open the valve an de-energized to permit spring closure of the valve. A seal element is secured on the armature of the solenoid armature. The seal element has a skirt portion which sealingly engages an armature sleeve to inhibit exhaust gas vapors from entering the chamber housing the solenoid coil and electronic sensing elements. The solenoid actuator has a pole piece defining one end of the chamber. A plurality of vent slots formed in the pole piece provide communication to atmosphere for the chamber to permit removal of any inadvertent intrusion by moisture or vapor.

7 Claims, 1 Drawing Sheet

SOLENOID ACTUATOR WITH SEALED ARMATURE

TECHNICAL FIELD

This invention relates to solenoid actuated valves.

BACKGROUND OF THE INVENTION

Internal combustion gasoline engines include numerous environmental control mechanisms including an exhaust gas recirculation (EGR) valve. The purpose of the EGR is to recirculate exhaust gas in the exhaust manifold to the inlet manifold. This will, as is well-known, reduce the emissions found in the normal exhaust of a gasoline engine and can increase fuel economy is some instances.

The EGR valve is controlled in opening by an electronically controlled solenoid device and in closing by a spring member. The solenoid is actuated to open a valve element and deactuated to permit the spring to close the valve element. The exhaust gas that is recirculated through the valve includes liquid and vapor corrosive elements that are detrimental to the working life of the solenoid and the electronic controls such as a position feedback sensor.

SUMMARY OF THE INVENTION

It is an object of the present invention to provide an improved gas valve.

In one aspect of the present invention, a solenoid controlled valve adapted for use as an EGR valve has a flexible seal element that is secured to a component of the solenoid. In another aspect of the present invention, the seal element has a flexible lip portion sealingly abutting an adjacent component of the solenoid.

In yet another aspect of the present invention, the solenoid armature has a neck portion engaged by the seal element and an armature sleeve having an annular end portion disposed in sealing contact with a lip of the seal element. In a still another aspect of the invention, a venting structure is disposed adjacent to a lower end of and unsealed portion of the solenoid to provide drainage.

In a further aspect of the present invention, the venting structure includes slots extending radially from a central portion of a lower portion of a primary pole piece and outer slots extending radially and axially from the outer periphery of the primary pole piece.

BRIEF DESCRIPTION OF THE DRAWINGS

The drawing is an elevational view partly in section of a solenoid controlled gas valve adapted for use as an EGR valve incorporating the present invention.

DESCRIPTION OF THE PREFERRED EMBODIMENT

Figure 1:
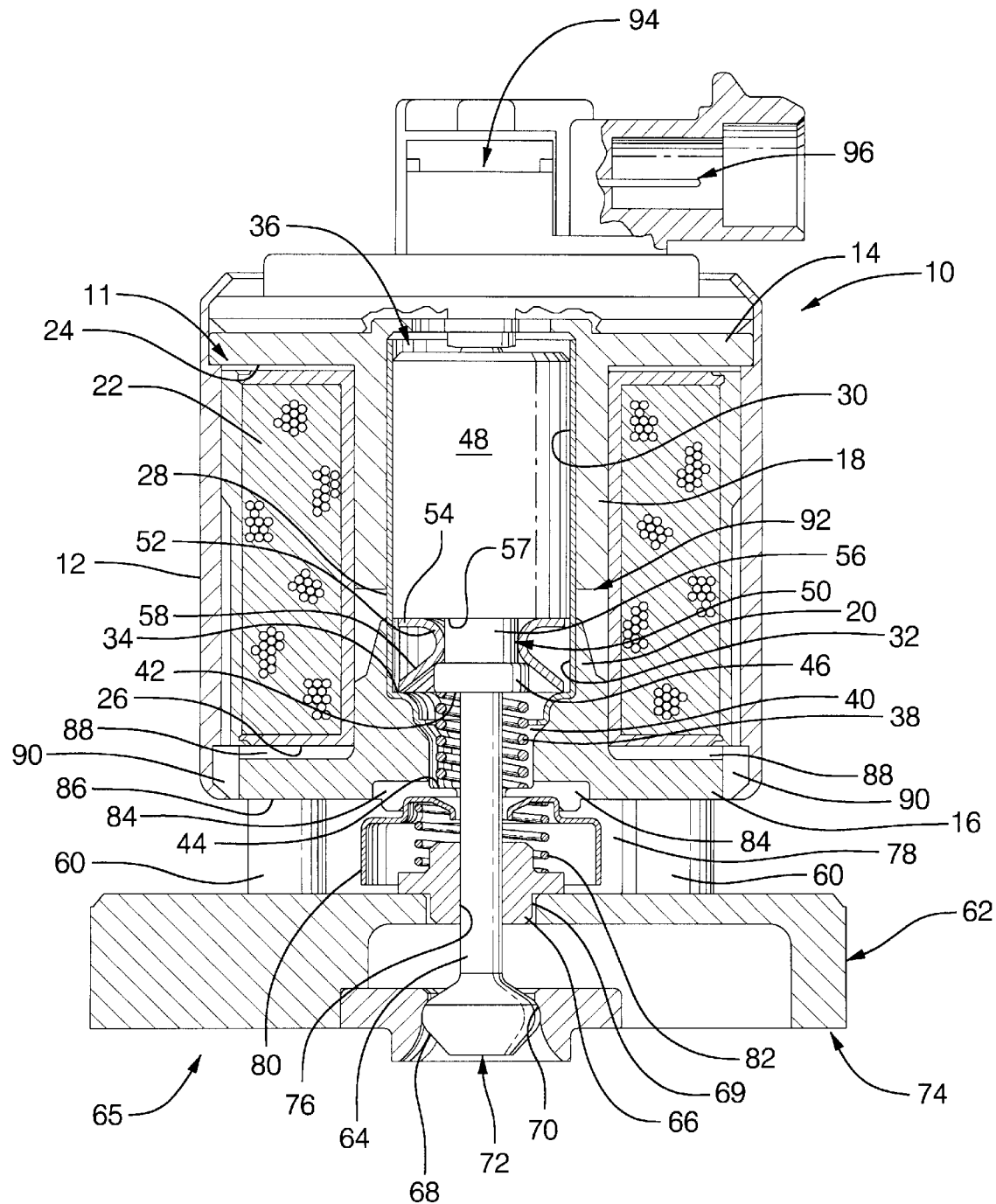

A solenoid exhaust gas recirculation (EGR) valve 10 has an actuator subassembly 11 including a housing 12 secured to an upper pole piece 14 and a lower pole piece 16. The upper pole piece 14 has a substantially cylindrical portion or extension 18 and the lower pole piece 16 has a substantially cylindrical portion or extension 20. A coil 22 is disposed internally of the housing 12 and circumjacent the cylindrical extensions 18 and 20. The coil 22 is also disposed between an inner flat surface 24 on the upper pole piece 14 and an inner flat surface 26 on the lower pole piece 16.

An armature sleeve 28 is fitted in cylindrical openings 30 and 32 formed in the upper pole piece 14 and lower pole piece 16 respectively. The armature sleeve 28 has an annular bottom wall 34. An armature 36 is slidably disposed in the armature sleeve 28 and is urged upwardly toward the upper pole piece 14 by a spring 38 positioned in a spring chamber 40 formed in the lower pole piece 16. The spring 38 is trapped between an end 42 of the armature 36 and an annular wall 44 formed on the lower pole piece 16. The armature 36 has a nose portion 46 formed between a main body 48 and the end 42.

The nose portion 46 has an annular recess portion 50 in which a seal 52 is retained. The seal 52 has a collar 54 held tightly against a cylindrical wall 56 of the annular recess 50 and abutting an annular wall 57 on the main body 48. The elastic qualities of the collar 54 insure that a vapor and moisture seal is formed between the surface of the recess 50 and the collar 54 The seal 52 has a skirt portion 58 depending divergently from the collar 54 and sealingly engaging the annular bottom wall 34 of the armature sleeve 28. The elastic qualities of the skirt portion 58 insure a vapor and moisture barrier is present at the interface of the skirt portion 58 and the annular wall 34 of the armature sleeve 28 The seal 52 prevents moisture and vapors from entering between the armature 36 and the armature sleeve 28 and also from entering the interior of the housing 12 from the spring chamber 40.

The lower pole piece 16 is supported on a plurality of spacers 60 and secured to a base 62 with fasteners, not shown. The armature 36 has a valve extension 64 that extends through the lower pole piece 16, the spacer 60 and a bushing 66 into the base 62. The base 62, valve extension 64 and the bushing 66 cooperate to form a metering subassembly 65. The valve extension 64 has a rounded end 68 that cooperates with a valve seat 70, secured in the base 62, to control gas flow between an exhaust gas inlet passage 72 and an exhaust gas outlet passage 74. The valve extension 64, the bushing 66 and the spring chamber 40 are, therefore, subjected to the vapors of the exhaust gas as it passes through the EGR valve 10. The bushing 66 is secured in the base 62 and has a central opening 76 in which the valve extension 64 is guided. The fit between opening 76 in the bushing 66 and the valve extension is sufficiently loose so as to permit free sliding action but retard vapor and moisture flow. The free axial movement is important in maintaining low residual losses such that the power of the solenoid is available to move the armature efficiently. The bushing 66 limits the radial float of the valve extension 64. An annular space 69 formed between the bushing 66 and the base 62 accommodates any resultant misalignment between the actuator subassembly 11 and the metering subassembly 65 to further reduce the hysteresis losses.

A space 78 central of the spacers 60 accommodates a splash shield 80 and a spring 82. The splash shield inhibits moisture from entering the spring cavity 40. Since the EGR valve 10 is positioned underhood on a vehicle, moisture from road splash is a constant hazard to be protected against. However, the spring cavity 40 and the interior of the housing 12 are not hermetically sealed and some moisture intrusion will occur. To limit the exposure time from the inadvertent moisture intrusion, at least two radially extending vent slots 84 are formed in an outer or undersurface 86 of the lower pole piece 16. These vent slots permit any moisture to escape to the outer surface of the splash shield 80.

A second set of radial vent slots 88 are formed in the upper surface 26 of the lower pole piece 16. These slots 88 intersect axial slots 90. The slots 88 and 90 cooperate to vent the solenoid chamber 92 formed by the housing 12, the upper pole piece 14 and the lower pole piece 16. This will facilitate drainage of any moisture that inadvertently passes the seal 52 and enters the chamber 92 and also prevent pressure build-up inside the actuator. The skirt 58 of the seal 52 is designed to inhibit the entrance of vapor or moisture into the solenoid chamber 92 and, especially, the position sensor 94. The seal 52 is designed by conventional methods such that the skirt 58 is sufficiently flexible to present a minimum of resistance to the reciprocating movement of the armature 36 under the influence of the solenoid coil 22. The skirt 58 does exert a spring force that acts in concert with the force of spring 38 thereby permitting the spring 38 to be designed to impose less return force on the armature 36. Accordingly the spring 38 can be lighter.

The seal 52 is subjected to the exhaust gas vapors which is known to contain moisture which can have a corrosive effect on the inner components of the solenoid and the electronic circuitry and components associated therewith. One of these components is a conventional position sensor 94 which is situated on the upper surface of the EGR valve 10 and open to the armature 36 such that the position thereof can be determined. The position of the armature 36 is an indication of the degree of opening at the valve extension 64. This determination is important in establishing the amount of exhaust gas that is being recirculated. Adjacent the sensor 94 is a conventional electrical connector 96 which connects the solenoid coil 22 with a conventional electronic control, not shown, capable of emitting a variable electrical control signal to the solenoid coil 22.

The seal 52 and the vent passages 84, 88 and 90 cooperate to extend the operating life of the EGR valve by inhibiting exposure of the internal components to corrosive elements. The vent passages 84, 88 and 90 are in communication with the atmosphere, and are not therefore subjected to the exhaust vapors of the vehicle. The effect of these improvements in the EGR valve 10 reduce the overall cost of maintenance of the vehicle.

While the invention has been described with respect to certain preferred embodiments and for application to EGR valves, such description and application are offered by way of illustration purposes only and shall not be interpreted to limit the full scope of the invention as claimed as follows.

What is claimed is:

1. A gas valve comprising:

a solenoid chamber housing a selectively energizable solenoid coil and an armature sleeve;

an armature reciprocally disposed in said armature sleeve in said solenoid chamber for movement in one direction under the influence of said solenoid coil and in an opposite direction under the influence of a spring;

a seal engaging an outer surface of a portion of said armature and having a skirt portion engaging an inner surface of said armature sleeve for sealing said solenoid chamber from a first environment; and a pole piece defining one boundary of said solenoid chamber having a spring chamber including a wall providing a reaction surface for said spring and a plurality of vent slots communicating between said solenoid chamber and a second environment.

2. The gas valve defined in claim 1 further comprising:

said pole piece having a first surface adjacent said coil, said vent slots including at least a first pair of radially extending slots formed in said first surface and at least a second pair of axial slots communicating between respective ones of said pair of radially extending slots and said second environment.

3. The gas valve defined in claim 1 further comprising:

said seal skirt portion having a spring force acting in concert with said spring to urge said armature in said opposite direction.

4. The gas valve defined in claim 1 further comprising:

said pole piece having a second surface spaced from said first surface and said solenoid chamber; and a second plurality of vent slots comprising at least a pair of radially extending slots formed in said second surface and communicating between said spring chamber and said second environment.

5. A gas valve comprising:

a solenoid chamber housing a selectively energizable solenoid coil;

an armature sleeve disposed in said solenoid chamber internally of said armature including an internal annular end surface;

a pole piece with an annular inner end surface defining one boundary of said solenoid chamber, a spring chamber radially inward of said annular end surface including a wall providing a reaction surface and a plurality of radial vent slots in said annular end surface communicating between said solenoid chamber and a second environment;

a spring seated against said reaction surface;

an armature reciprocally disposed in said armature sleeve in said solenoid chamber for movement in one direction under the influence of said solenoid coil and in an opposite direction under the influence of said spring, said armature having an end contacted by said spring and a recess portion adjacent said end; and a seal including a collar sealingly engaging an outer surface of said recess portion of said armature and a skirt portion engaging said internal end surface of said armature sleeve for sealing said solenoid chamber from a first environment during reciprocation of said armature.

6. The gas valve defined in claim 5 further comprising:

said pole piece having an outer surface spaced from said annular inner end surface and said solenoid chamber; and a second plurality of vent slots comprising at least a pair of radially extending slots formed in said outer surface and communicating between said spring chamber and said second environment.

7. The gas valve defined in claim 5 further comprising:

said seal skirt portion having a spring force acting in concert with said spring to urge said armature in said opposite direction.

* * * * *